(12) United States Patent
Guha et al.

(10) Patent No.: US 12,495,331 B2
(45) Date of Patent: Dec. 9, 2025

(54) SYSTEMS AND METHODS FOR USER-TRIGGERED SERVICE BOOST

(71) Applicant: Verizon Patent and Licensing Inc., Basking Ridge, NJ (US)

(72) Inventors: Ratul K. Guha, Warwick, PA (US); Lixia Yan, Basking Ridge, NJ (US); Zainab Ababri, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 415 days.

(21) Appl. No.: 18/159,820

(22) Filed: Jan. 26, 2023

(65) Prior Publication Data
US 2024/0259876 A1 Aug. 1, 2024

(51) Int. Cl.
*H04W 28/08* (2023.01)

(52) U.S. Cl.
CPC ... *H04W 28/0967* (2020.05); *H04W 28/0925* (2020.05)

(58) Field of Classification Search
CPC ......... H04M 15/8044; H04M 15/8016; H04M 15/8055; H04M 15/805; H04W 28/0273; H04W 4/24; H04W 28/0268; H04W 60/00; H04W 28/0263; H04W 40/246; H04L 47/20
See application file for complete search history.

(56) References Cited

U.S. PATENT DOCUMENTS

| | | | |
|---|---|---|---|
| 2022/0188600 A1* | 6/2022 | Li | G06F 7/5443 |
| 2022/0272623 A1* | 8/2022 | Watfa | H04W 76/10 |
| 2022/0345931 A1* | 10/2022 | Svennebring | H04M 15/8044 |
| 2025/0150888 A1* | 5/2025 | Kim | H04W 60/00 |

* cited by examiner

*Primary Examiner* — Jung Liu

(57) ABSTRACT

In some implementations, a network device may receive an indication that a user equipment (UE) satisfied one or more conditions to obtain a temporary performance increase for wireless traffic. The network device may store information associating a wireless network subscription of the UE with the temporary performance increase based on the indication. The network device may receive a request from the UE to activate the temporary performance increase for wireless traffic associated with an application. The network device may provision a wireless network flow associated with the temporary performance increase based on the request. The network device may send information to configure one or more UE route selection policy (URSP) rules to the UE, wherein the one or more URSP rules include one or more parameters that enable the UE to route the wireless traffic associated with the application over the wireless network flow associated with the temporary performance increase.

20 Claims, 10 Drawing Sheets

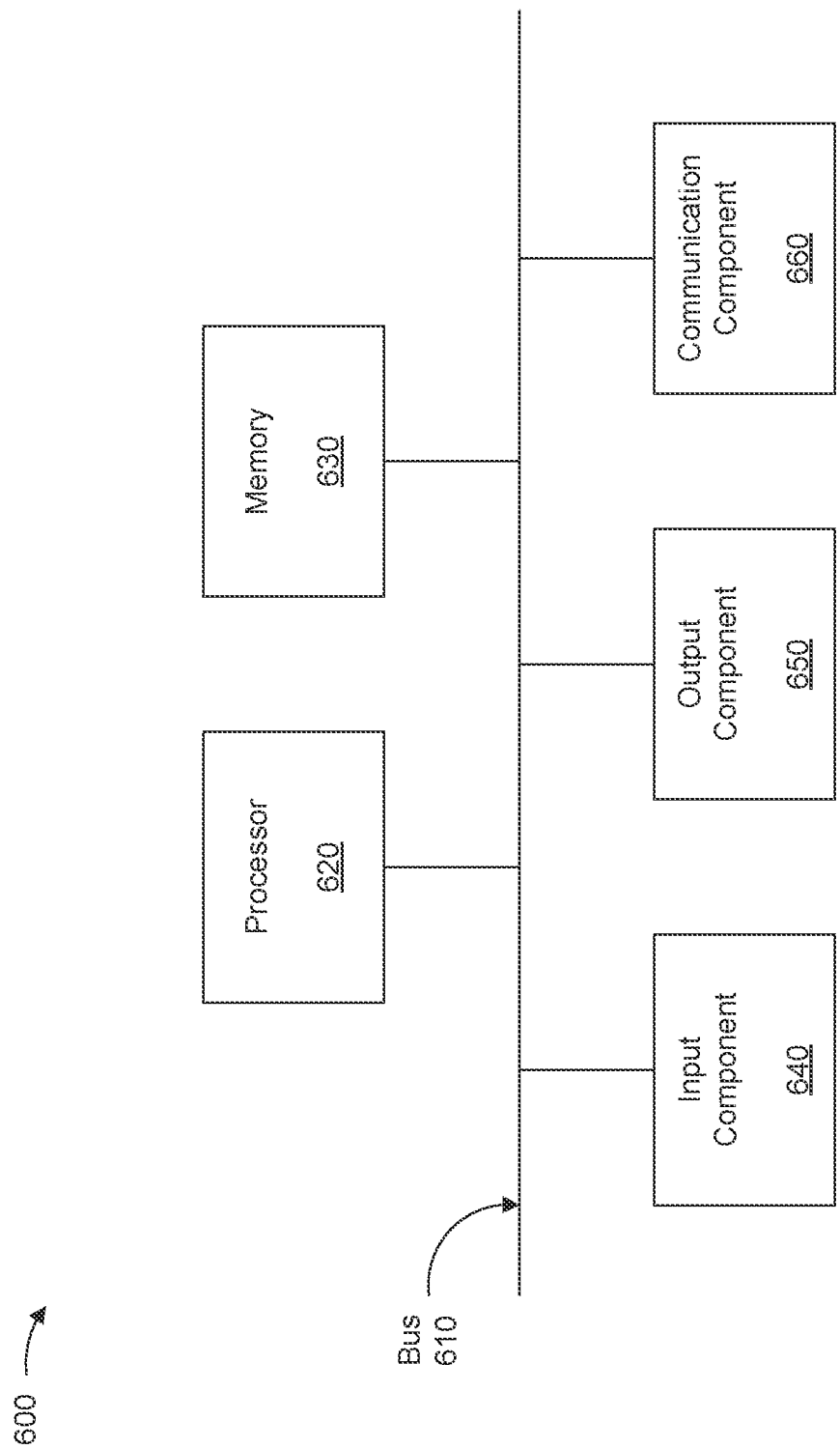

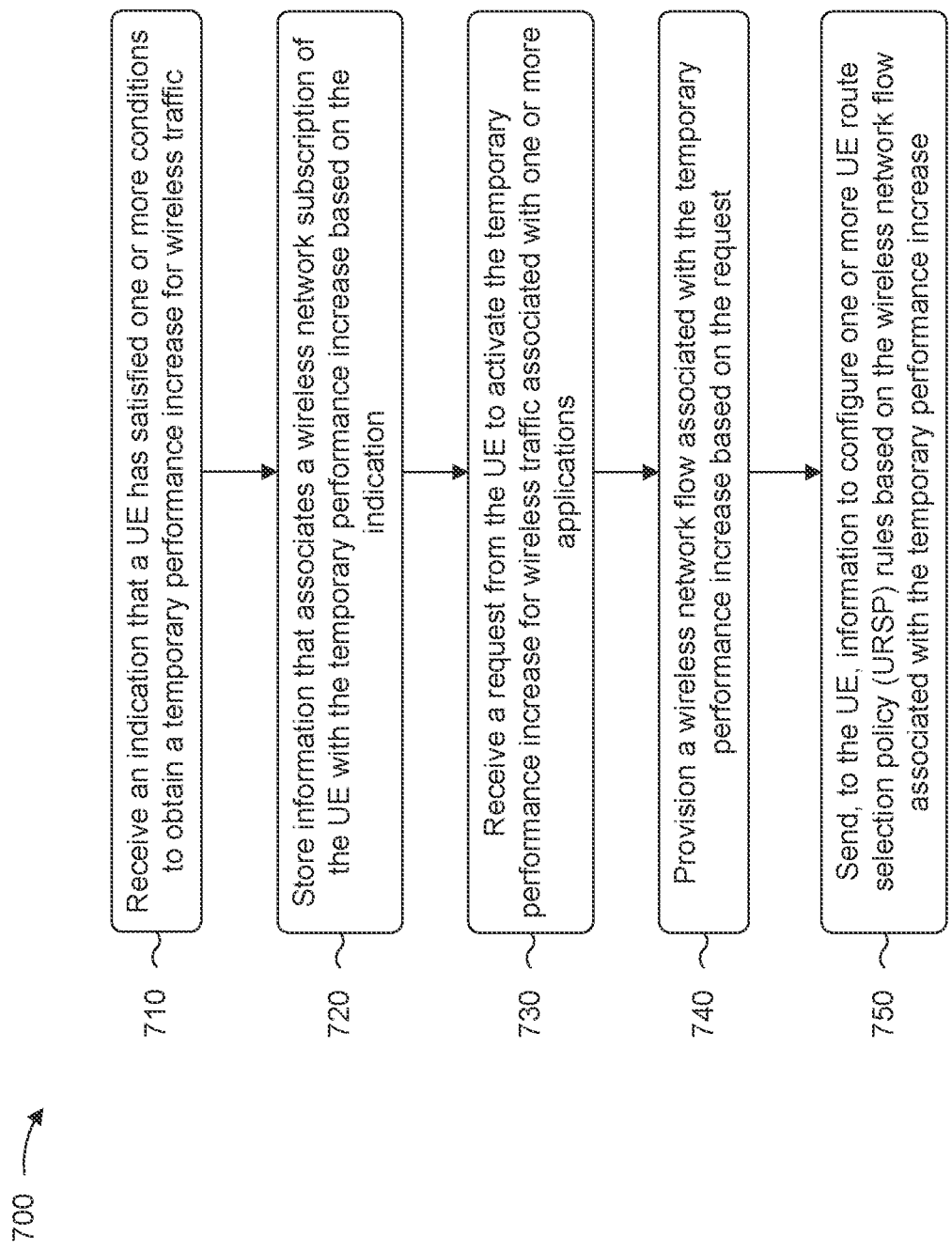

SYSTEMS AND METHODS FOR USER-TRIGGERED SERVICE BOOST

BACKGROUND

As wireless network and wireless device technology has improved, customer usage patterns and overall reliance on wireless devices have continued to evolve. In order to meet customer expectations and provide a satisfying network quality experience, a wireless network may enforce quality of service (QoS) at a QoS flow level to provide different QoS to different applications, users, or data flows, or to guarantee a certain performance level to a particular data flow. In some cases, QoS may be quantitatively measured using certain metrics, such as packet loss, bit rate, throughput, transmission delay, and/or jitter, among other examples.

BRIEF DESCRIPTION OF THE DRAWINGS

FIG. 6 is a diagram of example components of one or more devices of FIG. 5.

FIG. 7 is a flowchart of an example process related to a user-triggered service boost.

DETAILED DESCRIPTION OF EXAMPLE EMBODIMENTS

Figure 1:
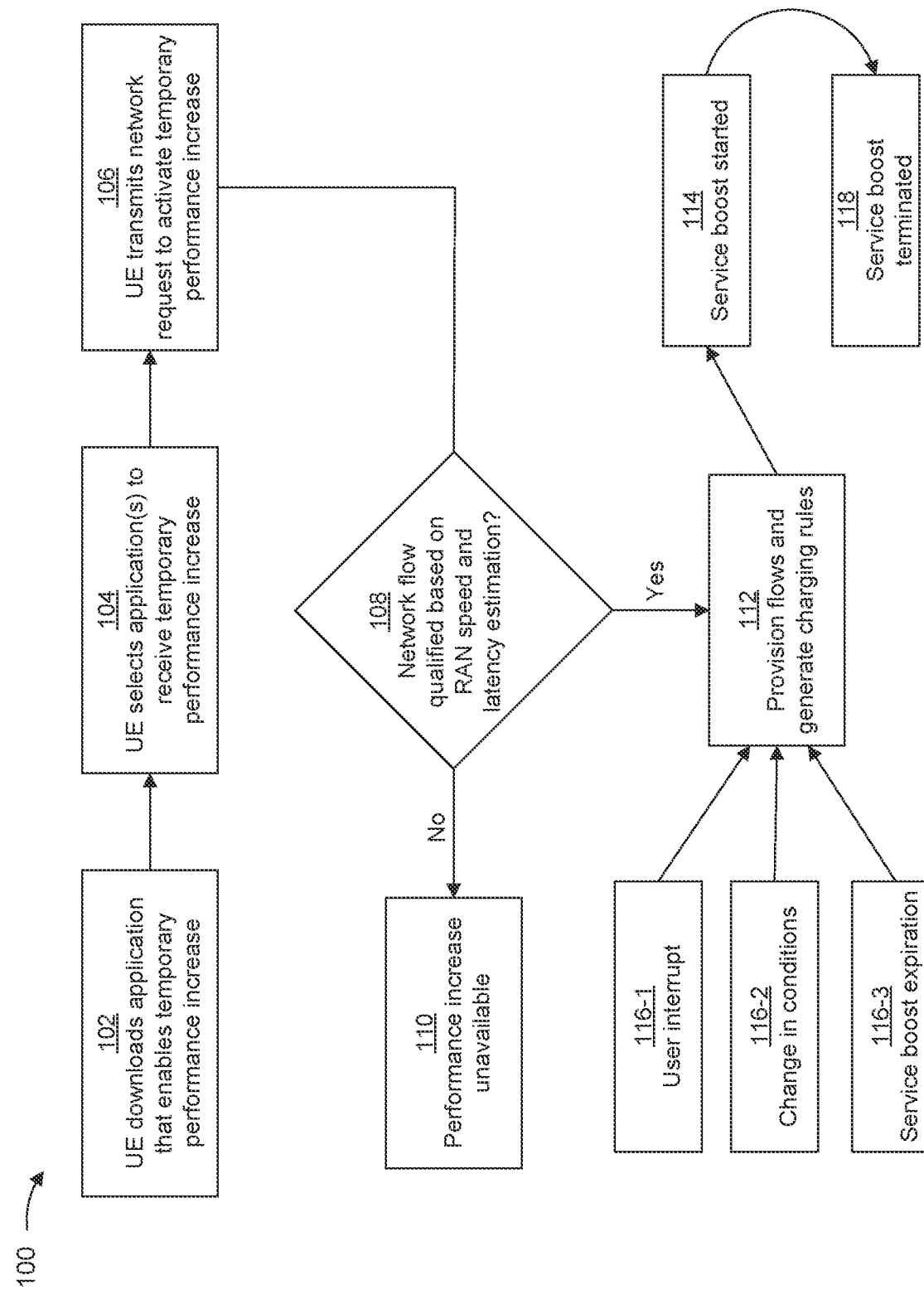
FIG. 1 is a diagram of an example high-level flow associated with a user-triggered service boost.

The following detailed description of example implementations refers to the accompanying drawings. The same reference numbers in different drawings may identify the same or similar elements.

In a wireless network, a quality of service (QoS) model may be based on QoS flows, where each QoS flow in the wireless network is associated with a unique identifier such as a QoS flow identifier (QFI). For example, user plane traffic with the same QFI generally receives the same forwarding treatment, with every QoS flow (e.g., associated with a QFI) in a wireless network having a QoS profile that includes one or more QoS parameters and/or QoS characteristics. In this way, the wireless network may provide different service levels and/or may guarantee different performance levels to different applications that are associated with different QoS flows, QFIs, and/or QoS profiles. For example, latency and jitter may be important QoS parameters for an application associated with video traffic, but may be less important than speed or throughput for an application associated with a file download. In another example, an extended reality or gaming application may experience a low quality of experience (QoE) in a wireless network that provides a high bitrate but a long latency or significant jitter, but a file download may experience a high QoE if throughput is high even when latency or transport continuity is relatively poor.

Accordingly, because a protocol data unit (PDU) session on a wireless network may have different QoS requirements depending on the application, wireless networks typically support multiple traffic classes to satisfy different QoS or QoE requirements for different applications. For example, the wireless network may detect an application associated with a particular PDU session and assign a QFI or QoS profile to the QoS flow associated with the application to satisfy certain QoS or QoE requirements associated with the application. However, as wireless networks and wireless device technologies continue to evolve, QoS and/or QoE requirements can change with evolutions in technology as user expectations change. Furthermore, because applications are evolving at such a rapid pace, network-side application detection is imperfect (e.g., because application names, application types, mobile operating systems, and/or other variables evolve over time). As a result, a wireless network cannot realistically assign separate QoS flows to each application in a reliable manner. For example, a user equipment (UE) may launch an application that requires a certain QoS (e.g., a minimum downlink speed or throughput, latency, and/or jitter, among other examples), but the wireless network may be unable to assign the appropriate QoS flow if the application cannot be reliably detected. For example, in addition to factors such as changes in application names, application types, and/or mobile operating systems, the wireless network may be unable to detect the application running on the UE in cases where the traffic associated with the application is routed through a tunnel, through a virtual private network (VPN), and/or using a protocol (e.g., Quick User Datagram Protocol (UDP) Internet Connections (QUIC)) that interfere with reliable application detection. As a result, the wireless network may assign application traffic to a QoS flow that offers suboptimal performance for one or more applications.

In some implementations, as described herein, a network operator may provide a UE with a capability to obtain a temporary increase in performance for one or more applications, such as a temporary increase in speed (or throughput), a temporary reduction in latency, a temporary reduction in jitter, and/or any suitable combination thereof. For example, the UE may download and install an application provided by the network operator that includes various options to obtain a temporary performance increase for one or more specific applications or for each application running on the UE. For example, the application provided by the network operator may include a menu of options that allow a user of the UE to select an increased performance option (e.g., increased speed, reduced latency, reduced jitter, or the like) and a time duration (e.g., a number of hours), and to provide a payment to obtain authorization for the increased performance for the associated time duration. In this way, the user of the UE may select (e.g., via a user interface of the application provided by the network operator) one or more applications to receive the temporary increase in performance or may select an option to apply the temporary increase in performance to all applications running on the UE, which may trigger a request to a wireless network to activate the temporary performance increase. For example, based on the request, one or more network devices may estimate a speed and/or a latency that is available over one or more wireless network flows (e.g., QoS flows), and may trigger a back-end provisioning process to alter performance settings for the one or more wireless network flows based on a determination that the estimated speed and/or latency satisfies one or more thresholds associated with the temporary increase in performance requested by the UE.

In some implementations, after the one or more wireless network flows have been suitably provisioned, one or more UE route selection policy (URSP) rules may be sent to the UE to enable the appropriate application traffic to be routed over the wireless network flows associated with the temporary performance increase. Accordingly, the UE may then route the traffic associated with the one or more applications over the wireless network flows associated with the temporary performance increase based on the one or more URSP rules, and performance associated with the one or more applications may return to a baseline level (e.g., a default wireless network flow) when one or more termination triggers are satisfied (e.g., the UE interrupts or otherwise requests termination of the temporary increase in performance, an estimated speed and/or latency fails to satisfy a threshold that was committed for the temporary performance increase, and/or the temporary performance increase expires). In this way, the user of the UE may have an ability to temporarily increase the performance level for one or more applications running on the UE without having to rely on application detection by the wireless network and various controls may be implemented to ensure that the appropriate QoS metrics (e.g., speed and latency) are estimated and validated in real-time throughout a session duration to ensure that the guaranteed QoE or QoS level is being provided or to terminate the temporary performance increase in cases where the QoE or QoS level cannot be provided (e.g., allowing the user to utilize the temporary performance increase at another time when the QoE or QoS level can be provided).

FIG. 1 is a diagram of an example high-level flow 100 associated with a user-triggered service boost. As described herein, the example high-level flow 100 includes communication between a UE and one or more network devices associated with a wireless network (e.g., one or more base stations, core network devices, server devices, or the like).

As shown in FIG. 1, and by block 102, a UE may download and install an application that enables the UE to obtain and request a temporary performance increase for one or more applications running on the UE. For example, in some implementations, the application that enables the UE to request and obtain a temporary performance increase may be provided by a network operator, and may include a menu with various options that a user of the UE can select to obtain a ticket, a token, a credential, or other suitable information that authorizes a temporary performance increase for one or more applications running on the UE. For example, in some implementations, the application may include options to obtain an increase in speed (e.g., downlink and/or uplink throughput), a reduced delay or latency, a reduced jitter, a reduced packet loss, and/or other QoS parameters that relate to an increase in performance relative to baseline QoS parameters that are provided over a default wireless network flow. In some implementations, the options provided by the application may include different thresholds or granularities for the performance increase, and may allow the user to obtain the authorization for the temporary performance increase for a specified time duration, for the duration of a current session, for one or more specific applications running on the UE, and/or for all applications running on the UE. Furthermore, in some implementations, each option for a temporary performance increase may be associated with a corresponding cost that the user of the UE may be allowed to pay via an appropriate transaction processing mechanism (e.g., an in-app payment system, a web-based payment portal, or the like), where the cost may vary depending on the level of performance increase and/or the duration of the temporary performance increase.

As further shown in FIG. 1, and by block 104, the UE may then receive a user input that selects one or more applications to receive the temporary performance increase. For example, the user may select one or more applications, one or more traffic types, and/or all traffic on the UE to receive the temporary performance increase. Furthermore, in some implementations, the user may select or indicate a type of the temporary performance increase to be provided to the selected application(s). For example, the user may indicate that the selected application(s) are to receive a temporary increase in speed, a temporary reduction in latency, and/or a temporary reduction in jitter, among other examples. As further shown in FIG. 1, and by block 106, the UE may then transmit a network request to activate the temporary performance increase. For example, the user may purchase the temporary performance increase using the application that is downloaded from a server associated with the network operator, and the UE may transmit the network request to the server associated with the network operator to activate the temporary performance increase at any subsequent time. Additionally, or alternatively, the user may purchase the temporary performance increase at the same time that the application(s) to receive the temporary increase are selected and the network request is transmitted to the server associated with the network operator.

As further shown in FIG. 1, and by block 108, one or more network devices associated with a wireless network may then determine whether a wireless network flow to support the temporary performance increase is available based on a radio access network (RAN) speed estimation, a RAN latency estimation, and/or other suitable conditions. For example, when the server associated with the network operator receives the request to activate the temporary performance increase, the server may determine whether the user of the UE requesting the temporary performance increase has satisfied one or more conditions to obtain the temporary performance increase, such as purchasing a valid ticket, token, credential, or other authorization for the requested performance increase. In cases where the user has failed to satisfy the one or more conditions, the server may respond to the UE with an indication that the user needs to obtain the authorization for the requested performance increase (e.g., provide appropriate payment) or otherwise satisfy any applicable conditions, as shown by block 110. Alternatively, in cases where the user has provided payment for the temporary performance increase or otherwise satisfied any applicable conditions, the server may perform a network flow qualification to verify that a suitable wireless network flow (e.g., a QoS flow) can be allocated to provide the temporary performance increase requested by the UE.

For example, in some implementations, the network flow qualification performed by the server may be flexibly configured to allow or grant all requests for temporary performance increases, or to allow or grant a request for a temporary performance increase only when one or more performance metrics satisfy requirements of the (requested) temporary performance increase. For example, in some implementations, the one or more performance metrics may be associated with one or more base station (or RAN) measurements and/or based on one or more tracking area code (TAC) measurements, among other examples. For example, in some implementations, the one or more RAN measurements may include a physical resource block (PRB)

utilization, a number of radio resource control (RRC) connections, a burst user throughput, a radio link control (RLC) volume, a transmission time interval (TTI) utilization, and/or average number of connected users, among other examples. Additionally, or alternatively, the one or more TAC measurements may include one or more transport metrics, such as a total throughput, a frame delay, and/or a frame loss, among other examples. Furthermore, the RAN measurements and/or the TAC measurements may each be associated with a respective congestion level that is used to apply a weighting function to the various measurements. For example, the measurements that are monitored to determine whether a qualified wireless network flow is available for the temporary performance increase may be sorted into bins based on the weighting function, which may be applied such that a lower value for the performance metric provides a relatively more favorable performance (e.g., a high PRB utilization may generally translate to a relatively low speed, and a low PRB utilization may translate to a relatively high speed).

Accordingly, as shown in FIG. 1, and by blocks 108 and 110, the server associated with the network operator may determine whether a qualified network flow is available to service the request for the temporary performance increase, and may respond to the UE to indicate that the requested performance increase is unavailable in cases where the RAN speed estimation, latency estimation, and/or other estimated metrics fail to satisfy one or more thresholds associated with the requested performance increase. Alternatively, as shown by block 112, one or more network devices (e.g., one or more core network devices in a wireless network) may provision the qualified network flows and generate charging rules in cases where the RAN speed estimation, latency estimation, and/or other estimated metrics satisfy the one or more thresholds associated with the requested performance increase.

For example, in one use case from a perspective of the UE, the user of the UE may use a gaming application or another suitable application that has a high speed (or throughput), low latency, low jitter, or other suitable QoS requirement, and traffic associated with the application may initially be routed over a default wireless network flow associated with a default access point name (APN) and data packets associated with the application may be charged accordingly. In cases where the user wants to temporarily boost the performance of the application, the user may purchase a ticket, token, credential, or other authorization for a temporary performance increase through the server associated with the network operator, and the server may provision information related to the authorization for a temporary performance increase into a charging function (CHF) included in a core network associated with the network operator. For example, the information provisioned to the CHF may indicate a duration of the temporary performance increase (e.g., two hours) and/or may indicate a type of performance increase (e.g., increased speed, reduced latency, reduced jitter, or the like). In some implementations, the CHF may then notify a session management function (SMF) and a policy control function (PCF) to associate a subscription of the UE with the temporary performance increase acquired by the UE. The PCF then sends one or more URSP rules to the UE, where the URSP rules enable the UE to route traffic associated with the gaming application over a wireless network flow associated with a PDU session that provides a higher speed, a lower latency, and/or a lower jitter than the default flow. The UE may then communicate with one or more core network devices (e.g., the SMF and/or an access and mobility management function (AMF) that communicates with the SMF) to establish the PDU session that provides the temporary performance increase. After a brief service interruption, the UE may then use the URSP rules to route the traffic associated with the gaming application over the wireless network flow associated with the PDU session that provides the temporary performance increase, and the temporary performance increase may be started, as shown by block 114.

As further shown in FIG. 1, and by blocks 116-1, 116-2, and 116-3, the service boost may continue (e.g., the UE may continue to route traffic associated with one or more applications over the wireless network flow associated with the PDU session that provides the temporary performance increase) until one or more termination triggers are satisfied. For example, as shown by block 116-1, the termination trigger may be a user interrupt that includes a request to discontinue, suspend, or otherwise terminate the temporary performance increase for the wireless traffic associated with the selected application(s) (e.g., because the user is quitting or ending a gaming session that needed the performance boost). In this example, as shown by block 118, the service boost may be terminated, and any remaining duration that may be available for the temporary performance increase may be associated with the subscription of the UE for potential future use. For example, if the user purchased a two hour service boost and utilized the service boost for one hour, the user may have a one hour service boost available to be activated at a later time. Additionally, or alternatively, as shown by block 116-2, the service boost may be terminated in cases where radio conditions change such that the speed, latency, jitter, or other QoS parameters provided over the provisioned wireless network flow are unable to satisfy one or more committed thresholds for the temporary performance increase. For example, in some implementations, the speed, latency, jitter, or other QoS parameters provided over the provisioned wireless network flow may be monitored in real-time, and the temporary performance increase may be terminated in cases where the service actually being provided does not satisfy a threshold associated with the temporary performance increase purchased by the user. In this example, as shown by block 118, the service boost may be terminated, and any remaining duration that may be available for the temporary performance increase may be associated with the subscription of the UE for potential future use.

Additionally, or alternatively, as shown by block 116-3, the service boost may be terminated in cases where the service boost expires. For example, in some implementations, the user may purchase a temporary performance increase that lasts a specific duration, and the service boost may expire when the specific duration has elapsed (e.g., after two hours of usage when a two hour service boost is purchased). In this example, as shown by block 118, the service boost may be terminated when the service boost has expired, and the user may be required to purchase or otherwise obtain a new service boost to request another temporary performance increase. For example, in one use case from a perspective of one or more network devices (e.g., the server associated with the network operator and/or one or more core network devices), the UE may attempt to use multiple applications, each of which are associated with a set of URSP rules that are configured on the UE to route traffic associated with the respective applications over a wireless network flow associated with a temporary performance increase (e.g., a low latency flow associated with a low latency data network name (DNN)). In some implementations, the UE may then attempt to use a first application, which may trigger a procedure to establish a PDU session associated with the low latency DNN and an appropriate network slice selection assistance information (NSSAI) identifier. In some implementations, the PCF may then request that the SMF install a set of URSP rules for the multiple applications.

For example, in a use case where there are two applications, the URSP rules may include a first URSP rule associating a first rating group (RG) identifier with a first application, a second URSP rule associating a second RG identifier with a second application, and a third URSP rule associating a third RG identifier with default applications where each URSP rule is associated with a default QoS class identifier (QCI). In some implementations, when data traffic associated with the first application arrives at the SMF, the SMF may query the CHF to determine a performance increase quota available for the first RG identifier, and the SMF may similarly query the CHF to determine a performance increase quota available for the second RG identifier when data traffic associated with the second application arrives at the SMF. In one example, for illustrative purposes, the performance increase quota available for the first RG identifier may be two hours, and the performance increase quota available for the second RG identifier may be four hours. Accordingly, after two hours have elapsed, the SMF may again query the CHF for the performance increase quota available for the first RG identifier, and in this case the CHF may indicate that the available performance increase quota is zero hours (e.g., expired). Furthermore, the CHF may notify the PCF that there is no remaining performance increase time available for the first RG identifier. Accordingly, the SMF may start to drop subsequent packets associated with the first RG identifier, and the PCF may take appropriate action based on the notification from the PCF that there is no remaining performance increase time available for the first RG identifier (e.g., sending updated URSP rules to the UE such that the UE routes traffic associated with the first application over a default wireless network flow and is allowed to route traffic associated with the second application over the low latency wireless network flow for up to another two hours).

As indicated above, FIG. 1 is provided as an example. Other examples may differ from what is described with regard to FIG. 1. For example, although FIG. 1 shows example blocks, in some implementations, high-level flow 100 may include additional blocks, fewer blocks, different blocks, or differently arranged blocks than those depicted in FIG. 1. Additionally, or alternatively, two or more of the blocks depicted in FIG. 1 may be performed in parallel.

Figure 2A:
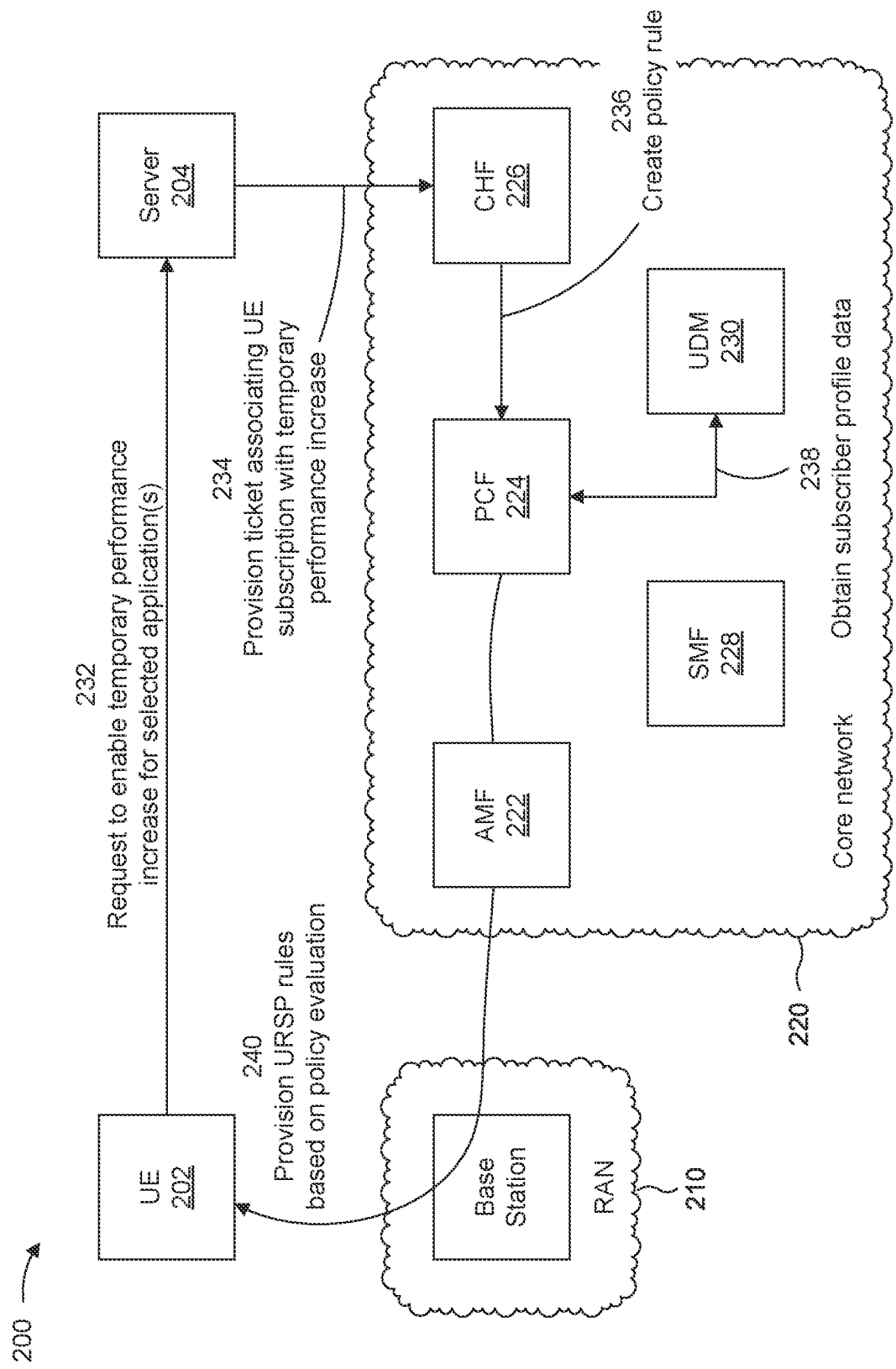
FIGS. 2A-2C are diagrams of an example associated with establishing a protocol data unit session for a selected application to receive a user-triggered service boost.
Figure 2B:
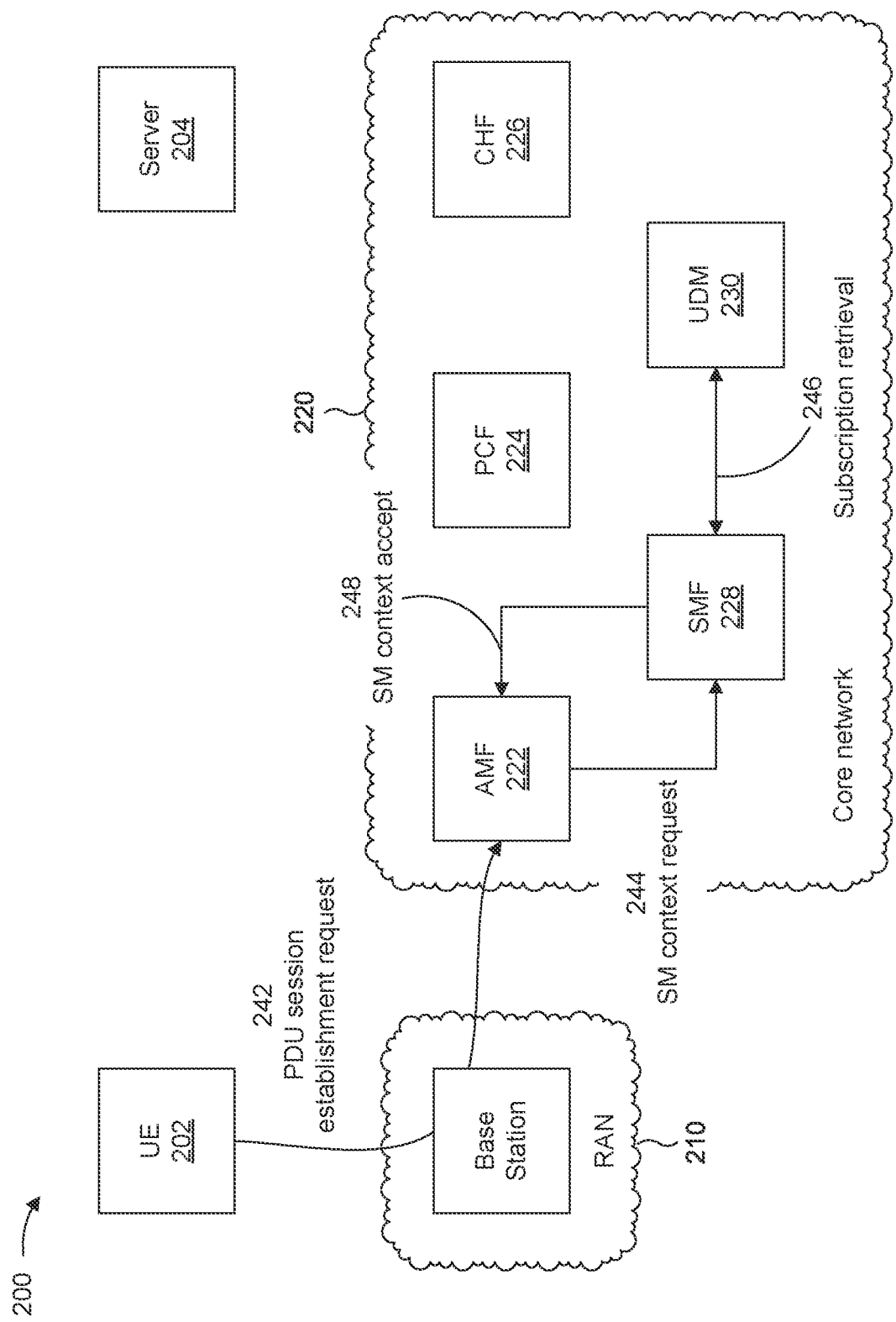
Figure 2C:
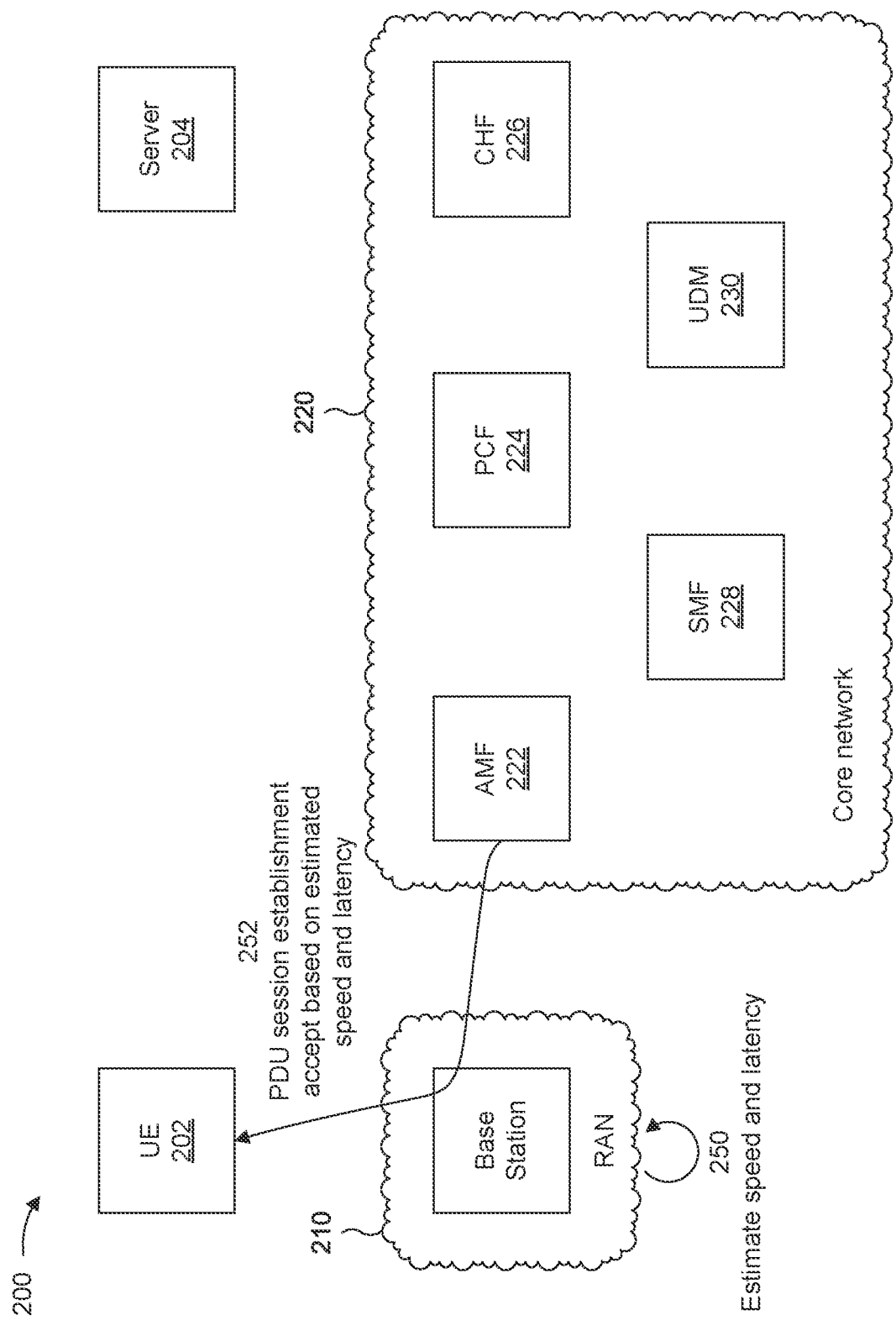

FIGS. 2A-2C are diagrams of an example 200 associated with establishing a PDU session for a selected application to receive a user-triggered service boost. As shown in FIGS. 2A-2C, example 200 includes communication between a UE 202, a server 204 associated with a network operator, a RAN 210 that includes one or more base stations or other network nodes, and a core network 220 that includes an AMF 222, a PCF 224, a CHF 226, and SMF 228, and a unified data management (UDM) component 230, among other components or network functions that are not shown in FIGS. 2A-2C.

As shown in FIG. 2A, and by reference number 232, the UE 202 may transmit, to the server 204 associated with the network operator, a request to enable a temporary performance increase for one or more selected applications and/or for all traffic on the UE 202. For example, in some implementations, the request provided by the UE 202 may include a DNN associated with the selected application(s), a start timestamp indicating when the temporary performance increase is to start, and/or a provision duration indicating how long the temporary performance increase is to be active. As shown by reference number 234, the server 204 may then provision the CHF 226 with a ticket to associate the subscription of the UE 202 with the temporary performance increase. As shown by reference number 236, the CHF 226 may then communicate with the PCF 224 to create a policy rule in the PCF 224 associating the subscription of the UE 202 with the temporary performance increase. As shown by reference number 238, the PCF 224 may then communicate with the UDM 230 to retrieve subscriber profile data associated with the UE 202, which the PCF 224 may use to perform a policy evaluation for the UE 202. As further shown by reference number 240, the PCF 224 may then provision one or more URSP rules to the UE 202 (e.g., via the AMF 222 and the RAN 210) based on the policy evaluation.

For example, as described herein, the URSP rules provisioned to the UE 202 may generally include one or more parameters that enable the UE 202 to route traffic associated with an application over a particular wireless network flow (e.g., a QoS flow that provides service that can satisfy one or more QoS parameters associated with the temporary performance increase, such as a guaranteed speed, latency, and/or jitter, among other examples). For example, when the PCF 224 receives the notification from the CHF 226, the PCF 224 may generate one or more URSP rules that are sent to the UE 202, where each URSP rule may include a traffic description with one or more domain descriptors configured by the PCF 224 (e.g., based on the DNN provided in the request from the UE 202). For example, in some implementations, a URSP rule may be configured with various octets, which may include one or more octets indicating a length of the URSP rule, one or more octets indicating a precedence value of the URSP rule, one or more octets indicating a length of a traffic descriptor, one or more octets that indicate the traffic descriptor, one or more octets indicating a length of a route selection descriptor list, and one or more octets indicating the route selection descriptor list. Furthermore, the traffic descriptor in a URSP rule may include one or more parameters to describe the traffic to be routed according to the corresponding URSP rule. For example, in some implementations, the one or more parameters included in the traffic descriptor may include an application descriptor (e.g., indicating an operating system identifier and one or more application identifiers), an Internet Protocol (IP) description that indicates a destination IP address, one or more domain descriptors (e.g., indicating destination fully-qualified domain names (FQDNs) or regular expressions used for domain name matching criteria), one or more non-IP descriptors (e.g., for destination information associated with non-IP traffic), a DNN that may be matched against the DNN information provided by the application, and one or more connection capabilities that may be matched against information that an application running on the UE 202 provides when requesting a wireless network connection with certain capabilities.

As shown in FIG. 2B, and by reference number 242, the UE 202 may then transmit a PDU session establishment request to the AMF 222 (e.g., via the RAN 210), where the PDU session establishment request may include a DNN, an NSSAI identifier, and a QFI associated with a wireless network flow to be provisioned for a PDU session. As shown by reference number 244, the AMF 222 may send a session management (SM) context request to the SMF 228, which may trigger the SMF 228 to retrieve a subscription of the UE 202 from the UDM 230, as shown by reference number 246. As shown by reference number 248, the SMF 228 may send an SM context accept message to the AMF 222 (e.g., based on the subscription information retrieved from the UDM 230 indicating that the UE 202 is authorized to activate a temporary performance increase for one or more QoS parameters, such as speed, latency, or jitter).

As shown in FIG. 2C, and by reference number 250, the RAN 210 may then estimate a speed and a latency that is available for the requested PDU session. For example, as described herein, the RAN 210 (or network edge) may generally represent the most variable aspect of the speed and the latency that is available to the UE 202, whereby the RAN 210 may be triggered to perform a speed and latency estimation to ensure that the QoS parameters available for the UE 202 are able to satisfy one or more requirements of the temporary performance increase requested by the UE 202. Furthermore, in some cases, the speed and latency available to the UE 202 may be estimated based on parameters related to core network performance, but the core network performance may be relatively more stable than the RAN 210 because the core network generally has larger bandwidth available to transport data traffic. As further shown by reference number 252, the AMF 222 may send a PDU session establishment accept message to the UE 202 based on a determination that the estimated speed and latency are able to satisfy one or more thresholds associated with the temporary performance increase (e.g., the estimated speed equals or exceeds a first threshold, such as five (5) megabits per second, and the estimated latency is less than or equal to a second threshold, such as fifty (50) milliseconds).

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
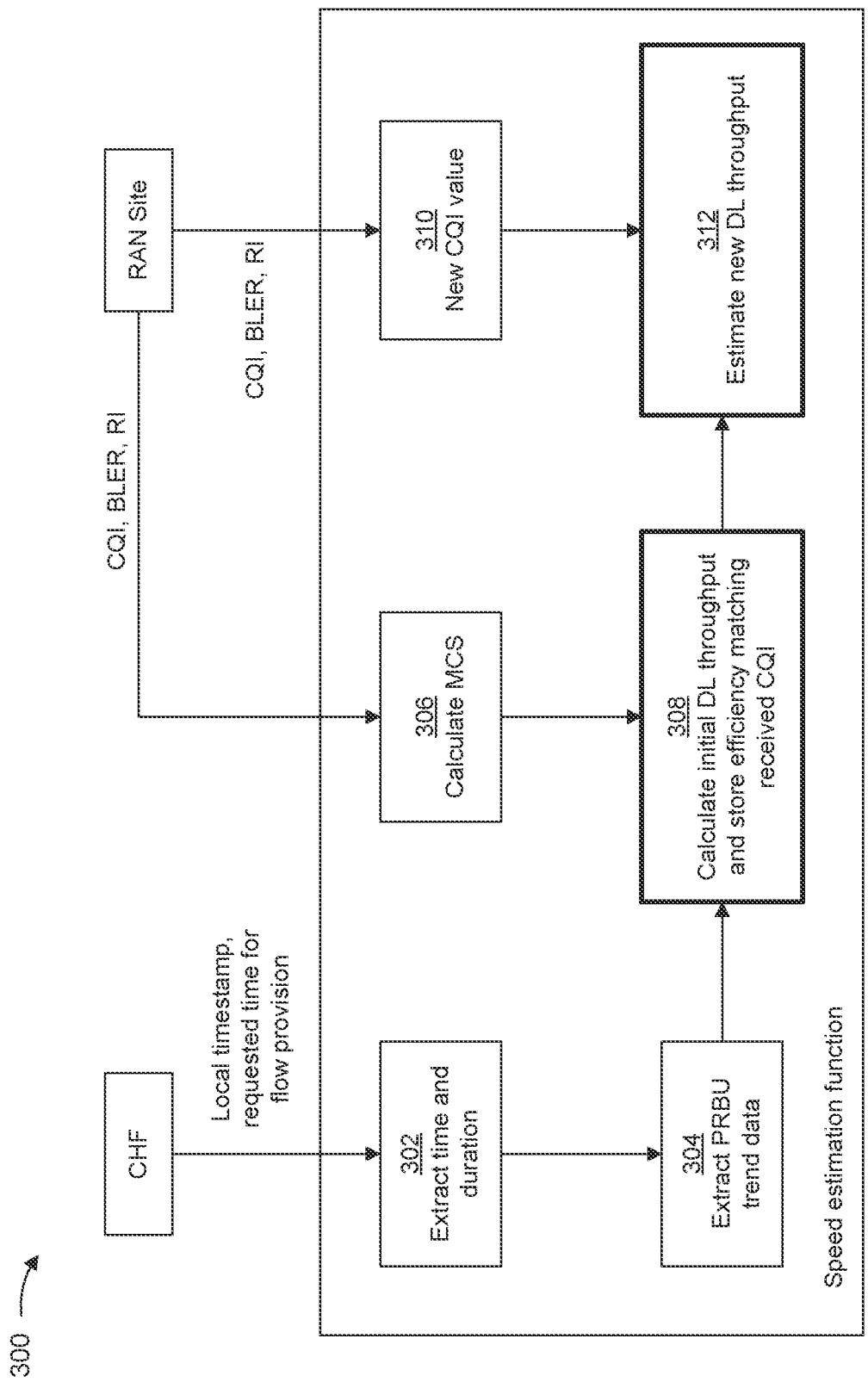
FIG. 3 is a diagram of an example speed estimation function that may estimate a speed or downlink throughput in connection with a requested or active user-triggered service boost.

FIG. 3 is a diagram of an example speed estimation function 300 that may estimate a speed or downlink throughput in connection with a requested or active user-triggered service boost. As shown in FIG. 3, the speed estimation function 300 may receive inputs from a CHF and a RAN site, and may use the inputs received from the CHF and the RAN site to estimate a speed (e.g., a downlink throughput) available for application traffic originating at a UE. In some implementations, the speed estimation function 300 may be provided in an AMF, an SMF, a PCF, a UDM, another core network device, and/or a server associated with a network operator.

In general, as described herein, the speed estimation function 300 may be used to estimate a speed as part of a network flow qualification (e.g., used to determine whether to provision a wireless network flow to support a temporary performance increase that the UE has requested to activate) and/or as part of real-time monitoring (e.g., used to determine whether to terminate or maintain a temporary performance increase activated by the UE). For example, in some implementations, a wireless network flow supporting a temporary performance increase for application traffic originating at the UE may be provisioned or maintained based on the speed estimation function 300 estimating an available network speed that satisfies a threshold, or the wireless network flow supporting the temporary performance may be indicated as unavailable or terminated based on the speed estimation function 300 estimating an available network speed that fails to satisfy the threshold.

In some implementations, the speed estimation function 300 may measure a baseline speed (e.g., associated with a default wireless network flow) by performing a network speed test, and may then estimate a speed that is available under the temporary performance increase using speed estimation logic. For example, as shown by block 302 in FIG. 3, the speed estimation function 300 may receive, from the CHF, a local timestamp and information indicating a requested time when a wireless network flow supporting the temporary performance increase is requested to be provisioned. As shown by block 302, the speed estimation function 300 may then extract time and duration information from the parameters input by the CHF. For example, in some implementations, the speed estimation function 300 may extract an hour of the day and a duration from the parameters input by the CHF. As shown by block 304, the speed estimation function 300 may then extract a PRB utilization (PRBU) trend per hour of the day, and may match the appropriate PRBU trend to the hour of the day indicated in the parameters input by the CHF. Furthermore, as shown by block 306, various parameters received from the RAN site, such as a channel quality indicator (CQI) value, a block error rate (BLER), and a rank indicator (RI), may be used to calculate a modulation and coding scheme (MCS) for the UE. Accordingly, as shown by block 308, the PRBU trend and MCS may be used to calculate an initial downlink throughput (or speed) available for the UE. In addition, the speed estimation function 300 may store a spectral efficiency metric matching the CQI value received from the RAN site. For example, one or more wireless communication standards may define various CQI indexes, each of which is associated with a modulation scheme and a code rate (together being used to determine the MCS) and a spectral efficiency.

Accordingly, the spectral efficiency value associated with the current CQI value received from the RAN site may be determined and used to estimate the speed that would be available if the temporary performance increase were activated. For example, as shown by block 310, the speed estimation function 300 may receive a new CQI value that is predicted for the UE if the temporary performance increase were to be activated. Accordingly, as shown by block 312, the speed estimation function 300 may then estimate the speed available to the UE if the temporary performance increase were to be activated based on the initial downlink throughput (e.g., measured using the baseline speed test), the spectral efficiency associated with the current CQI value associated with the UE, and the spectral efficiency associated with the predicted CQI value if the temporary performance increase were to be activated. For example, in a case where a measured downlink speed is 8 megabits per second (Mbps), the initial CQI value is 9 (which is associated with a spectral efficiency value of 2.4063), and the predicted CQI value is 11 (which is associated with a spectral efficiency value of 3.3223), the estimated speed may be calculated as $8 \times (3.3223/2.4063) = 11$ Mbps. In this example, the wireless network flow may be established or may continue if 11 Mbps satisfies (e.g., equals or exceeds) a downlink speed to be provided under the temporary performance increase, or the wireless network flow may be terminated or not established if 11 Mbps fails to satisfy (e.g., does not equal or exceed) the downlink speed to be provided under the temporary performance increase. Additionally, or alternatively, the speed and/or latency to be provided under the temporary performance increase may be a user-selectable threshold, which may serve as the performance criteria for the temporary performance increase (e.g., the session may be terminated if a measured speed and/or latency fails to satisfy the user-selectable speed and/or latency threshold).

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4A:
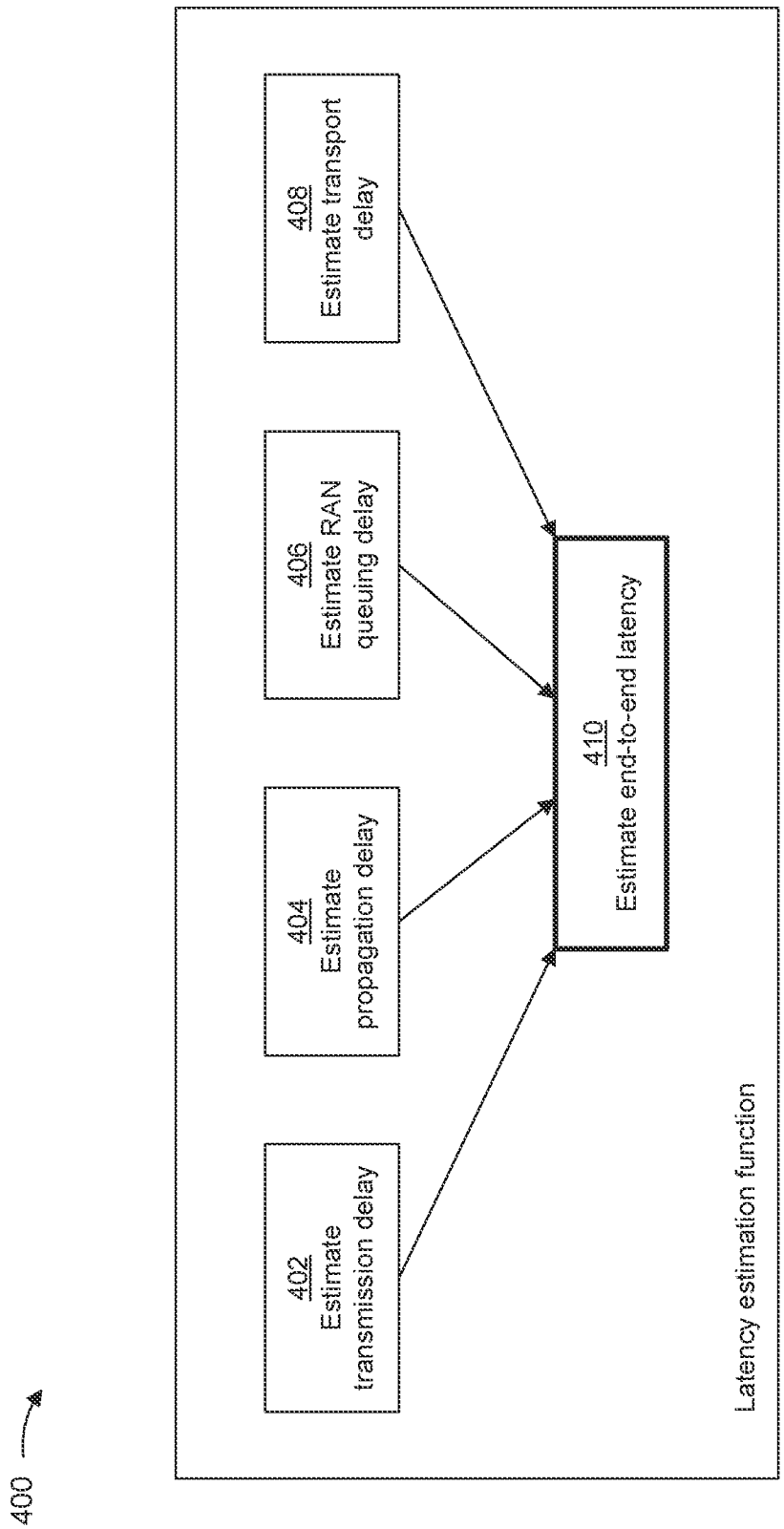
FIGS. 4A-4B are diagrams of an example latency estimation function that may estimate a latency or delay in connection with a requested or active user-triggered service boost.
Figure 4B:
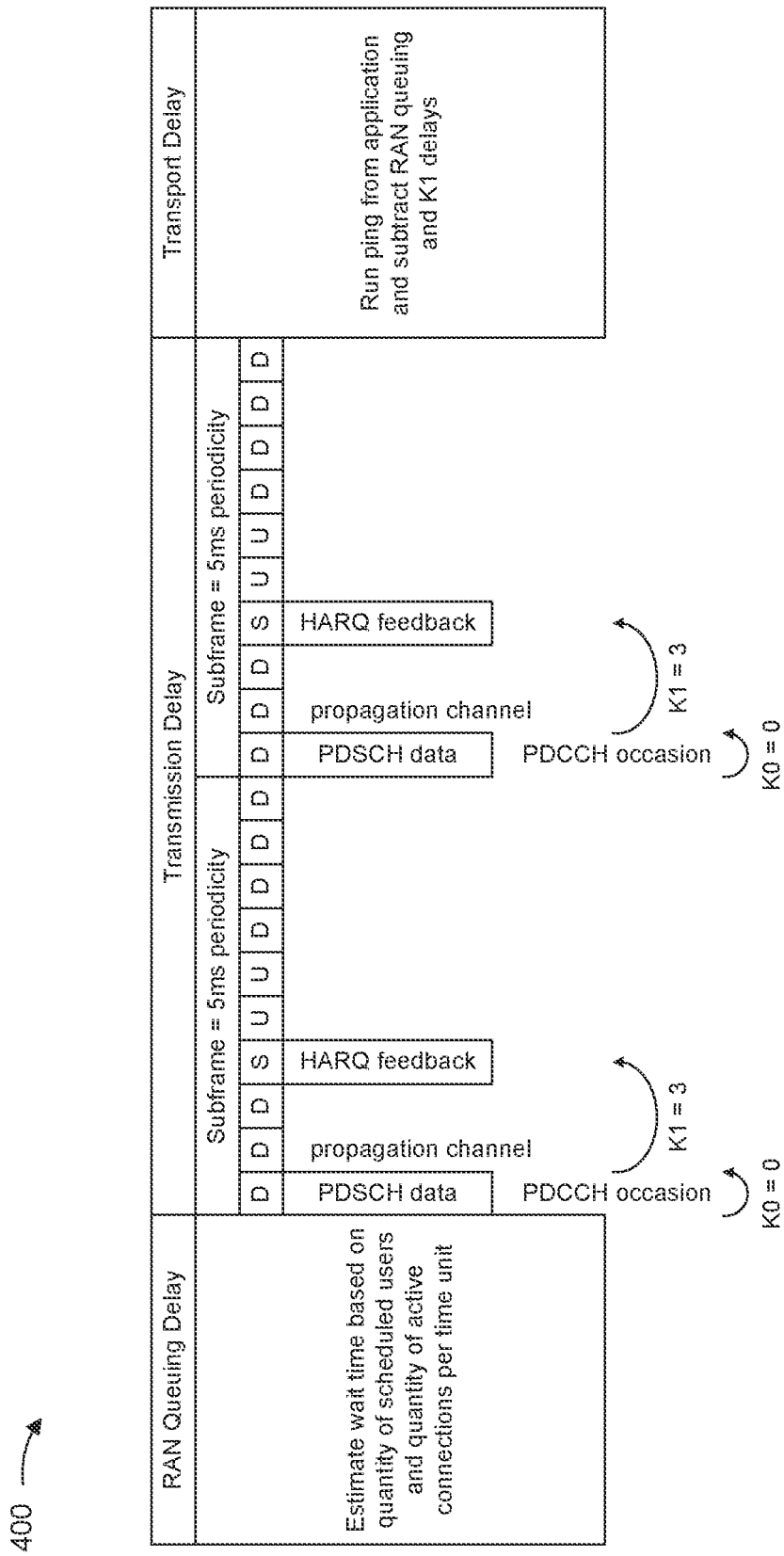

FIGS. 4A-4B are diagrams of an example latency estimation function 400 that may estimate a latency or delay in connection with a requested or active user-triggered service boost. As described herein, the latency estimation function 400 may use various inputs to estimate a latency (e.g., an end-to-end latency) available for application traffic originating at a UE. In some implementations, the latency estimation function 400 may be provided in an AMF, an SMF, a PCF, a UDM, another core network device, and/or a server associated with a network operator.

In general, as described herein, the latency estimation function 400 may be used to estimate a latency as part of a network flow qualification (e.g., used to determine whether to provision a wireless network flow to support a temporary performance increase that the UE has requested to activate) and/or as part of real-time monitoring (e.g., used to determine whether to terminate or maintain a temporary performance increase activated by the UE). For example, in some implementations, a wireless network flow supporting a temporary performance increase for application traffic originating at the UE may be provisioned or maintained based on the latency estimation function 400 estimating an available end-to-end latency that satisfies a threshold, or the wireless network flow supporting the temporary performance may be indicated as unavailable or terminated based on the latency estimation function 400 estimating an available end-to-end latency that fails to satisfy the threshold.

As shown in FIG. 4A, an end-to-end latency estimate may include a total latency attributable to a transmission delay, a propagation delay, a RAN queuing delay, and a transport delay. Accordingly, as described herein, the latency estimation function 400 may estimate a transmission delay, a propagation delay, a RAN queuing delay, and a transport delay, which may be summed to estimate the total end-to-end latency.

For example, as shown by block 402, the latency estimation function 400 may estimate the transmission delay based on a bandwidth and a frame configuration associated with the wireless network. Furthermore, as shown by block 404, the latency estimation function 400 may estimate the propagation delay based on a path loss and a frequency. For example, in some implementations, the propagation delay may be calculated as $10^{\wedge}((Path\_Loss+147.5-20\times \log_{10}(Freq))/20)/c$, where Path_Loss is a path loss measurement (e.g., dependent on a distance between the UE and the RAN site), Freq is a frequency that a RAN uses to communicate with a UE, and c is the speed of light. Furthermore, as shown by block 406, the latency estimation function 400 may estimate the RAN queuing delay based on a service rate parameter, $\mu$, that represents a number of scheduled users in a time unit (e.g., per hour), and based on an arrival rate parameter, $\lambda$, that represents a number of active connections in the same time unit. For example, in some implementations, the service rate parameter, $\mu$, may be calculated based on the number of scheduled users in a time unit, a capacity for a number of scheduled users, and a number of available resource blocks (RBs), and the arrival rate parameter, $\lambda$, may be calculated based on a QFI. In some implementations, the latency estimation function may then estimate the RAN queuing delay by calculating a wait time parameter as $\rho/(\mu-\lambda)$, where $\rho=\lambda/\mu$.

Furthermore, as shown by block 408, the latency estimation function 400 may estimate the transport delay based on a baseline latency test and estimated values for the transmission, propagation, and RAN queuing delays. For example, the transport delay (e.g., in a core network) may be calculated by subtracting the estimated values for the transmission, propagation, and RAN queuing delays from the initial latency value measured by the baseline test, as the transport delay is generally stable. For example, assuming a baseline latency of 50 milliseconds (ms), an estimated transmission latency of 1.5 ms, an estimated propagation delay of 10.6 ms, and an estimated RAN queuing delay of 35 ms, the transport delay may be 50-1.5-10.6-35=2.9 ms (e.g., assuming in this example that the UE is about 2 miles from a cell center and a k1 parameter indicating a number of slots between a physical downlink shared channel (PDSCH) message and a physical uplink control channel (PUCCH) carrying hybrid automatic repeat request (HARQ) feedback for the PDSCH message is 3 slots for a subcarrier spacing of 30 kilohertz (kHz)). Accordingly, as shown by block 410, the latency estimation function 400 may sum the estimated transmission delay, the estimated propagation delay, the estimated RAN queuing delay, and the estimated transport delay to estimate the total end-to-end latency. Accordingly, a wireless network flow supporting a temporary performance increase requested by the UE may be established or may continue if the estimated end-to-end latency satisfies (e.g., is less than or equal to) a latency to be provided under the temporary performance increase, or the wireless network flow may be terminated or not established if the estimated end-to-end latency fails to satisfy (e.g., equals or exceeds) the latency associated with the temporary performance increase.

For example, FIG. 4B illustrates an example timeline of the end-to-end latency for a downlink transmission in a time division duplexing (TDD) configuration associated with a "DDDSUUDDDD" configuration (e.g., a repeating pattern that starts with three downlink slots, which are followed by a special slot used for switching from downlink to uplink, which is followed by two uplink slots, which are followed by four downlink slots before the pattern repeats in a next subframe). In the example illustrated in FIG. 4B, the RAN queuing delay is calculated in the manner described above (e.g., as $\rho/(\mu-\lambda)$), and the transport delay is calculated by performing a ping from an application running on the UE and subtracting the RAN queuing delay and a delay associated with the K1 parameter that indicates the number of slots between a PDSCH message and a PUCCH message carrying HARQ feedback for the PDSCH message (e.g., three slots in the illustrated example). Accordingly, the transmission delay may be calculated based on the frame configuration and the bandwidth (e.g., the subframe periodicity, TDD configuration, subcarrier spacing, and/or other suitable parameters), and the propagation delay may be calculated based on path loss measurements and the frequency used for communication with the UE. In this way, the latency estimation function 400 may use the various delays to compute the total end-to-end latency to determine whether the latency committed for the temporary performance increase can be fulfilled based on network conditions.

As indicated above, FIGS. 4A-4B are provided as an example. Other examples may differ from what is described with regard to FIGS. 4A-4B. The number and arrangement of devices shown in FIGS. 4A-4B are provided as an example. In practice, there may be additional devices, fewer devices, different devices, or differently arranged devices than those shown in FIGS. 4A-4B. Furthermore, two or more devices shown in FIGS. 4A-4B may be implemented within a single device, or a single device shown in FIGS. 4A-4B may be implemented as multiple, distributed devices. Additionally, or alternatively, a set of devices (e.g., one or more devices) shown in FIGS. 4A-4B may perform one or more functions described as being performed by another set of devices shown in FIGS. 4A-4B.

Figure 5:
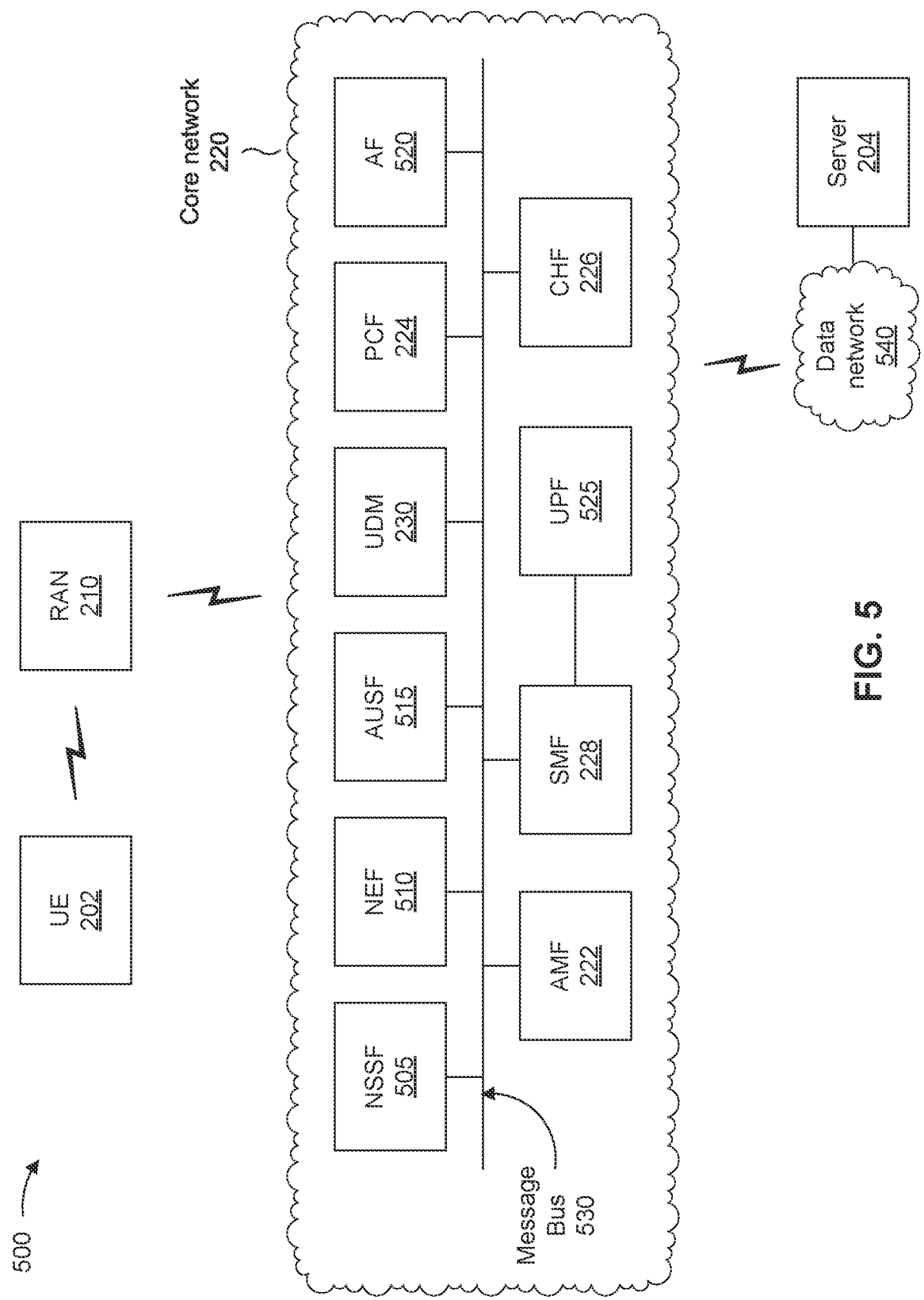
FIG. 5 is a diagram of an example environment in which systems and/or methods described herein may be implemented.

FIG. 5 is a diagram of an example environment 500 in which systems and/or methods described herein may be implemented. As shown in FIG. 5, example environment 500 may include a UE 202, a RAN 210, a core network 220, and a data network 540. Devices and/or networks of example environment 500 may interconnect via wired connections, wireless connections, or a combination of wired and wireless connections.

UE 202 includes one or more devices capable of receiving, generating, storing, processing, and/or providing information, such as information associated with a user-triggered service boost described herein. For example, UE 202 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

RAN 210 may support, for example, a cellular radio access technology (RAT). RAN 210 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for UE 202. RAN 210 may transfer traffic between UE 202 (e.g., using a cellular RAT), one or more base stations (e.g., using a wireless interface or a backhaul interface, such as a wired backhaul interface), and/or core network 220. RAN 210 may provide one or more cells that cover geographic areas.

In some implementations, RAN 210 may perform scheduling and/or resource management for UE 202 covered by RAN 210 (e.g., UE 202 covered by a cell provided by RAN 210). In some implementations, RAN 210 may be controlled or coordinated by a network controller, which may perform load balancing, network-level configuration, and/or other operations. The network controller may communicate with RAN 210 via a wireless or wireline backhaul. In some implementations, RAN 210 may include a network controller, a self-organizing network (SON) module or component, or a similar module or component. In other words, RAN 210 may perform network control, scheduling, and/or network management functions (e.g., for uplink, downlink, and/or sidelink communications of UE 202 covered by RAN 210).

In some implementations, core network 220 may include an example functional architecture in which systems and/or methods described herein may be implemented. For example, core network 220 may include an example architecture of a fifth generation (5G) next generation (NG) core network included in a 5G wireless telecommunications system. While the example architecture of core network 220 shown in FIG. 2 may be an example of a service-based architecture, in some implementations, core network 220 may be implemented as a reference-point architecture and/or a 4G core network, among other examples.

As shown in FIG. 5, core network 220 may include a number of functional elements. The functional elements may include, for example, a network slice selection function (NSSF) 505, a network exposure function (NEF) 510, an authentication server function (AUSF) 515, a UDM component 230, a PCF 224, an application function (AF) 520, an AMF 222, an SMF 228, a user plane function (UPF) 525, and/or a CHF 226. These functional elements may be communicatively connected via a message bus 530. Each of the functional elements shown in FIG. 5 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

NSSF 505 includes one or more devices that select network slice instances for UE 202. By providing network slicing, NSSF 505 allows an operator to deploy multiple substantially independent end-to-end networks potentially with the same infrastructure. In some implementations, each slice may be customized for different services.

NEF 510 includes one or more devices that support exposure of capabilities and/or events in the wireless telecommunications system to help other entities in the wireless telecommunications system discover network services.

AUSF 515 includes one or more devices that act as an authentication server and support the process of authenticating UE 202 in the wireless telecommunications system.

UDM 230 includes one or more devices that store user data and profiles in the wireless telecommunications system. UDM 230 may be used for fixed access and/or mobile access in core network 220. In some implementations, the UDM 230 may use a unified data repository (UDR) to store and retrieve subscription data.

PCF 224 includes one or more devices that provide a policy framework that incorporates network slicing, roaming, packet processing, and/or mobility management, among other examples.

AF 520 includes one or more devices that support application influence on traffic routing, access to NEF 510, and/or policy control, among other examples.

AMF 222 includes one or more devices that act as a termination point for non-access stratum (NAS) signaling and/or mobility management, among other examples.

SMF 228 includes one or more devices that support the establishment, modification, and release of communication sessions in the wireless telecommunications system. For example, SMF 228 may configure traffic steering policies at UPF 525 and/or may enforce user equipment IP address allocation and policies, among other examples.

UPF 525 includes one or more devices that serve as an anchor point for intra-RAT and/or inter-RAT mobility. UPF 525 may apply rules to packets, such as rules pertaining to packet routing, traffic reporting, and/or handling user plane QoS, among other examples.

CHF 226 includes one or more devices that provide an account balance management function, a rating function, and a charging gateway function. CHF 226 may play a role in monitoring usage consumption and policy counters for one or more subscribers, and may interact with PCF 224 to provide policy and charging control during service delivery. For example, CHF 226 may store policy counter information against a subscriber pricing plan and notify PCF 224 whenever a subscriber breaches or exceeds policy thresholds based on the usage consumption, and PCF 224 then interacts with SMF 228 to apply a policy decision.

Message bus 530 represents a communication structure for communication among the functional elements. In other words, message bus 530 may permit communication between two or more functional elements.

Data network 540 includes one or more wired and/or wireless data networks. For example, data network 540 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks. In some implementations, as shown, the data network 540 may include a server 204.

The server 204 may include one or more devices capable of receiving, generating, storing, processing, providing, and/or routing information associated with a user-triggered service boost, as described elsewhere herein. The server 204 may include a communication device and/or a computing device. For example, the server 204 may include an application server, a client server, a web server, a database server, a host server, a proxy server, a virtual server (e.g., executing on computing hardware), or a server in a cloud computing system. In some implementations, the server 204 may include computing hardware used in a cloud computing environment.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of example environment 500 may perform one or more functions described as being performed by another set of devices of example environment 500.

FIG. 6 is a diagram of example components of a device 600 associated with a user-triggered service boost. The device 600 may correspond to UE 202, RAN 210, NSSF 505, NEF 510, AUSF 515, UDM component 230, PCF 224, AF 520, AMF 222, SMF 228, UPF 525, CHF 226, and/or server 204. In some implementations, UE 202, RAN 210, NSSF 505, NEF 510, AUSF 515, UDM component 230, PCF 224, AF 520, AMF 222, SMF 228, UPF 525, CHF 226, and/or server 204 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

FIG. 7 is a flowchart of an example process 700 associated with a user-triggered service boost. In some implementations, one or more process blocks of FIG. 7 may be performed by a network device (e.g., server 204, UDM component 230, PCF 224, AMF 222, SMF 228, and/or CHF 226). In some implementations, one or more process blocks of FIG. 7 may be performed by another device or a group of devices separate from or including the network device, such as UE 202, RAN 210, NSSF 505, NEF 510, AUSF 515, AF 520, and/or UPF 525. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving an indication that a UE has satisfied one or more conditions to obtain a temporary performance increase for wireless traffic (block 710). For example, the network device may receive an indication that a UE has satisfied one or more conditions to obtain a temporary performance increase for wireless traffic, as described above. In some implementations, the temporary performance increase includes a reduction in latency, an increase in speed, and/or a reduction in jitter relative to a predefined threshold or a user-selected threshold associated with wireless traffic routed over a default wireless network flow.

As further shown in FIG. 7, process 700 may include storing information that associates a wireless network subscription of the UE with the temporary performance increase based on the indication (block 720). For example, the network device may store information that associates a wireless network subscription of the UE with the temporary performance increase based on the indication, as described above.

As further shown in FIG. 7, process 700 may include receiving a request from the UE to activate the temporary performance increase for wireless traffic associated with one or more applications (block 730). For example, the network device may receive a request from the UE to activate the temporary performance increase for wireless traffic associated with one or more applications, as described above.

As further shown in FIG. 7, process 700 may include provisioning a wireless network flow associated with the temporary performance increase based on the request (block 740). For example, the network device may provision a wireless network flow associated with the temporary performance increase based on the request, as described above.

As further shown in FIG. 7, process 700 may include sending, to the UE, information to configure one or more URSP rules based on the wireless network flow associated with the temporary performance increase (block 750). For example, the network device may send, to the UE, information to configure one or more URSP rules based on the wireless network flow associated with the temporary performance increase, as described above. For example, in some implementations, the one or more URSP rules may include one or more parameters that enable the UE to route the wireless traffic associated with the one or more applications over the wireless network flow associated with the temporary performance increase. For example, in some implementations, process 700 includes estimating, based on the request from the UE, a speed that is available for routing the wireless traffic associated with the one or more applications over the wireless network flow associated with the temporary performance increase, and estimating, based on the request from the UE, a latency that is available for routing the wireless traffic associated with the one or more applications over the wireless network flow associated with the temporary performance increase, and the wireless network flow associated with the temporary performance increase is provisioned and the information to configure the one or more URSP rules is sent to the UE based on the estimated speed and the estimated latency satisfying respective thresholds associated with the temporary performance increase.

In some implementations, estimating the speed that is available for routing the wireless traffic associated with the one or more applications over the wireless network flow associated with the temporary performance increase includes measuring a baseline speed and a baseline value for a performance metric associated with a default wireless network flow, and calculating a predicted value for the performance metric for the wireless network flow associated with the temporary performance increase, where the estimated speed that is available for routing the wireless traffic associated with the one or more applications over the wireless network flow associated with the temporary performance increase is based on the baseline speed, the baseline value for the performance metric, and the predicted value for the performance metric. Furthermore, the estimated latency that is available for routing the wireless traffic associated with the one or more applications over the wireless network flow associated with the temporary performance increase may be based on estimates for a transmission delay, a propagation delay, a transport delay, and a RAN queuing delay.

In some implementations, process 700 may include sending, to the UE, information to configure one or more updated URSP rules that include one or more parameters that cause the UE to route the wireless traffic associated with the one or more applications over a default wireless network flow based on a determination that one or more termination triggers are satisfied. For example, the one or more termination triggers may include an interrupt from the UE to terminate the temporary performance increase, expiration of the temporary performance increase, and/or an estimated performance metric failing to satisfy a threshold associated with the temporary performance increase. For example, in some implementations, the estimated performance metric may include an estimated speed and/or an estimated latency that may be estimated using techniques described in more detail elsewhere herein.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device, an indication that a user equipment (UE) has satisfied one or more conditions to obtain a temporary performance increase for wireless traffic;
   storing, by the network device, information that associates a wireless network subscription of the UE with the temporary performance increase based on the indication;
   receiving, by the network device, a request from the UE to activate the temporary performance increase for wireless traffic associated with one or more applications;
   provisioning, by the network device, a wireless network flow associated with the temporary performance increase based on the request and based on determining that the wireless network flow is able to satisfy one or more performance thresholds associated with the temporary performance increase; and
   sending, by the network device, information to configure one or more UE route selection policy (URSP) rules to the UE,
     wherein the one or more URSP rules include one or more parameters that enable the UE to route the wireless traffic associated with the one or more applications over the wireless network flow associated with the temporary performance increase.

2. The method of claim 1, further comprising:
   sending, to the UE, information to configure one or more updated URSP rules that include one or more parameters that cause the UE to route the wireless traffic associated with the one or more applications over a default wireless network flow based on a determination that one or more termination triggers are satisfied.

3. The method of claim 2, wherein the one or more termination triggers include one or more of an interrupt from the UE to terminate the temporary performance increase, expiration of the temporary performance increase, or an estimated performance metric failing to satisfy a threshold associated with the temporary performance increase.

4. The method of claim 1, further comprising:
   estimating, based on the request from the UE, a speed that is available for routing the wireless traffic associated with the one or more applications over the wireless network flow associated with the temporary performance increase; and
   estimating, based on the request from the UE, a latency that is available for routing the wireless traffic associated with the one or more applications over the wireless network flow associated with the temporary performance increase,
     wherein the wireless network flow associated with the temporary performance increase is provisioned and the information to configure the one or more URSP rules is sent to the UE based on the estimated speed and the estimated latency satisfying respective thresholds associated with the temporary performance increase.

5. The method of claim 4, wherein estimating the speed that is available for routing the wireless traffic associated with the one or more applications over the wireless network flow associated with the temporary performance increase includes:
measuring a baseline speed and a baseline value for a performance metric associated with a default wireless network flow; and
calculating a predicted value for the performance metric for the wireless network flow associated with the temporary performance increase,
wherein the estimated speed that is available for routing the wireless traffic associated with the one or more applications over the wireless network flow associated with the temporary performance increase is based on the baseline speed, the baseline value for the performance metric, and the predicted value for the performance metric.

6. The method of claim 4, wherein the estimated latency that is available for routing the wireless traffic associated with the one or more applications over the wireless network flow associated with the temporary performance increase is based on estimates for a transmission delay, a propagation delay, a transport delay, and a radio access network queuing delay.

7. The method of claim 1, wherein the temporary performance increase includes one or more of a reduction in latency, an increase in speed, or a reduction in jitter relative to a predefined threshold or a user-selected threshold associated with wireless traffic routed over a default wireless network flow.

8. A network device, comprising:
one or more processors configured to:
receive an indication that a user equipment (UE) has satisfied one or more conditions to obtain a temporary performance increase for wireless traffic;
store information that associates a wireless network subscription of the UE with the temporary performance increase based on the indication;
receive a request from the UE to activate the temporary performance increase for wireless traffic associated with one or more applications;
provision a wireless network flow associated with the temporary performance increase based on the request and based on determining that the wireless network flow is able to satisfy one or more performance thresholds associated with the temporary performance increase; and
send information to configure one or more UE route selection policy (URSP) rules to the UE,
wherein the one or more URSP rules include one or more parameters that enable the UE to route the wireless traffic associated with the one or more applications over the wireless network flow associated with the temporary performance increase.

9. The network device of claim 8, wherein the one or more processors are further configured to:
send, to the UE, information to configure one or more updated URSP rules that include one or more parameters that cause the UE to route the wireless traffic associated with the one or more applications over a default wireless network flow based on a determination that one or more termination triggers are satisfied.

10. The network device of claim 9, wherein the one or more termination triggers include one or more of an interrupt from the UE to terminate the temporary performance increase, expiration of the temporary performance increase, or an estimated performance metric failing to satisfy a threshold associated with the temporary performance increase.

11. The network device of claim 8, wherein the one or more processors are further configured to:
estimate, based on the request from the UE, a speed that is available for routing the wireless traffic associated with the one or more applications over the wireless network flow associated with the temporary performance increase; and
estimate, based on the request from the UE, a latency that is available for routing the wireless traffic associated with the one or more applications over the wireless network flow associated with the temporary performance increase,
wherein the wireless network flow associated with the temporary performance increase is provisioned and the information to configure the one or more URSP rules is sent to the UE based on the estimated speed and the estimated latency satisfying respective thresholds associated with the temporary performance increase.

12. The network device of claim 11, wherein the one or more processors, to estimate the speed that is available for routing the wireless traffic associated with the one or more applications over the wireless network flow associated with the temporary performance increase, are configured to:
measure a baseline speed and a baseline value for a performance metric associated with a default wireless network flow; and
calculate a predicted value for the performance metric for the wireless network flow associated with the temporary performance increase,
wherein the estimated speed that is available for routing the wireless traffic associated with the one or more applications over the wireless network flow associated with the temporary performance increase is based on the baseline speed, the baseline value for the performance metric, and the predicted value for the performance metric.

13. The network device of claim 11, wherein the estimated latency that is available for routing the wireless traffic associated with the one or more applications over the wireless network flow associated with the temporary performance increase is based on estimates for a transmission delay, a propagation delay, a transport delay, and a radio access network queuing delay.

14. The network device of claim 8, wherein the temporary performance increase includes one or more of a reduction in latency, an increase in speed, or a reduction in jitter relative to a predefined threshold or a user-selected threshold associated with wireless traffic routed over a default wireless network flow.

15. A non-transitory computer-readable medium storing a set of instructions, the set of instructions comprising:
one or more instructions that, when executed by one or more processors of a network device, cause the network device to:
receive an indication that a user equipment (UE) has satisfied one or more conditions to obtain a temporary performance increase for wireless traffic;

store information that associates a wireless network subscription of the UE with the temporary performance increase based on the indication;

receive a request from the UE to activate the temporary performance increase for wireless traffic associated with one or more applications;

provision a wireless network flow associated with the temporary performance increase based on the request and based on determining that the wireless network flow is able to satisfy one or more performance thresholds associated with the temporary performance increase; and send information to configure one or more UE route selection policy (URSP) rules to the UE, wherein the one or more URSP rules include one or more parameters that enable the UE to route the wireless traffic associated with the one or more applications over the wireless network flow associated with the temporary performance increase.

16. The non-transitory computer-readable medium of claim 15, wherein the one or more instructions further cause the network device to:

send, to the UE, information to configure one or more updated URSP rules that include one or more parameters that cause the UE to route the wireless traffic associated with the one or more applications over a default wireless network flow based on a determination that one or more termination triggers are satisfied.

17. The non-transitory computer-readable medium of claim 16, wherein the one or more termination triggers include one or more of an interrupt from the UE to terminate the temporary performance increase, expiration of the temporary performance increase, or an estimated performance metric failing to satisfy a threshold associated with the temporary performance increase.

18. The non-transitory computer-readable medium of claim 15, wherein the one or more instructions further cause the network device to:

estimate, based on the request from the UE, a speed that is available for routing the wireless traffic associated with the one or more applications over the wireless network flow associated with the temporary performance increase; and estimate, based on the request from the UE, a latency that is available for routing the wireless traffic associated with the one or more applications over the wireless network flow associated with the temporary performance increase, wherein the wireless network flow associated with the temporary performance increase is provisioned and the information to configure the one or more URSP rules is sent to the UE based on the estimated speed and the estimated latency satisfying respective thresholds associated with the temporary performance increase.

19. The non-transitory computer-readable medium of claim 18, wherein the one or more instructions, that cause the network device to estimate the speed that is available for routing the wireless traffic associated with the one or more applications over the wireless network flow associated with the temporary performance increase, cause the network device to:

measure a baseline speed and a baseline value for a performance metric associated with a default wireless network flow; and calculate a predicted value for the performance metric for the wireless network flow associated with the temporary performance increase, wherein the estimated speed that is available for routing the wireless traffic associated with the one or more applications over the wireless network flow associated with the temporary performance increase is based on the baseline speed, the baseline value for the performance metric, and the predicted value for the performance metric.

20. The non-transitory computer-readable medium of claim 18, wherein the estimated latency that is available for routing the wireless traffic associated with the one or more applications over the wireless network flow associated with the temporary performance increase is based on estimates for a transmission delay, a propagation delay, a transport delay, and a radio access network queuing delay.

* * * * *